United States Patent [19]

Gorden

[11] Patent Number: 5,125,871
[45] Date of Patent: Jun. 30, 1992

[54] AXIAL FLOW COMBINE ROTOR HAVING HELICAL EXTENSION MEMBERS IN FORWARD THRESHING AREA

[76] Inventor: Marvin J. Gorden, Rte. 1, Box 299, Sparta, Wis. 54656

[21] Appl. No.: 703,621

[22] Filed: May 21, 1991

[51] Int. Cl.[5] .............................................. A01F 12/20
[52] U.S. Cl. ........................................ 460/69; 460/72
[58] Field of Search ..................................... 460/66–72

[56] References Cited

U.S. PATENT DOCUMENTS

| | | | |
|---|---|---|---|
| 3,982,548 | 9/1976 | Stamp et al. | 460/70 X |
| 4,936,810 | 6/1990 | Strong et al. | 460/69 |
| 5,035,675 | 7/1991 | Dunn et al. | 460/72 X |

OTHER PUBLICATIONS

"Case International 1600 Series Axial-Flow Combines" 36 pages, Document No.: AD-60131CL.
"Axial-Flow Combined Specialty Rotor", 4 pages, Document No.: Form No. AD-60051A.

*Primary Examiner*—Thuy M. Bui
*Attorney, Agent, or Firm*—John R. Flanagan

[57] ABSTRACT

An axial flow combine rotor has an exterior surface, a checkerboard pattern of multiple spaced-apart attachment sites, and a checkerboard pattern of multiple spaced-apart threshing elements in criss-crossing helical rows defining continuous helical criss-crossing paths extending from an entry end to a discharge end of the rotor. The axial flow rotor additionally incorporates helical threshing extension members in its forward threshing area which are substituted for, and occupy the locations of, at least pairs of single-sited threshing elements on the rotor. The extension members are installed in pairs in order to maintain rotor balance. Each extension member replaces at least two of the original single-sited threshing elements of the checkerboard pattern. Each of the helical threshing extension members is installed in one of the helical rows in the forward threshing area of the rotor, connected to and spanning between at least a pair of the multiple spaced attachment sites.

10 Claims, 4 Drawing Sheets

AXIAL FLOW COMBINE ROTOR HAVING HELICAL EXTENSION MEMBERS IN FORWARD THRESHING AREA

BACKGROUND OF THE INVENTION

1. Field of the Invention

The present invention generally relates to crop harvesting equipment and, more particularly, is concerned with an axial flow combine rotor having helical threshing extension members spanning multiple spaced attachment sites disposed in helical rows in the forward threshing area of the axial flow rotor.

2. Description of the Prior Art

Combines for harvesting grain crops such as wheat, barley, oats and the like have been known for many years. The use of combines to harvest grain crops of this type has permitted the efficient production of grain grown on very large fields with minimum use of labor.

Progressively, combines have been developed which are capable of harvesting wider swaths of crop than previously and thus have resulted in recent combines being larger and more powerful, as well as more expensive, than earlier combines.

The increased cost of recent combines has also led to development of combines capable of harvesting a wider variety of grain crops than capable of being handled by earlier combines. This capability typically requires, at a minimum, the exchanging of one type of crop gathering header on the combine for another.

With respect to the threshing and separating mechanism of the combine, however, it is preferred that the mechanism be adapted to thresh and separate a wide variety of grain crops with the need to exchange only a bare minimum of harvesting elements. Adapting the mechanism to thresh and separate a wide variety of grain crops makes it necessary that the combine be able to handle crops varying in bulk, moisture content, toughness and other crop conditions.

One commercial axial flow combine, identified as the Case International Serial 1600 Axial-Flow Combine, employs a single, large-diameter, axial flow rotor to thresh and separate a wide variety of crops under a wide variety of crop conditions. The axial flow rotor, mounted longitudinally inline with the direction of travel of the combine and enclosed in a cylindrical cage, has a plurality of straight and helical rasp bars mounted about its exterior over a forward threshing area thereof which coact with concaves mounted to the cage to thresh the crop repeatedly as the crop is conveyed rearwardly. Also, the axial flow rotor has a plurality of straight separator bars mounted about its exterior over a rearward separating area thereof which coact with grates mounted to the cage to separate the grain from the threshed crop residue.

Recently, an improved axial flow rotor, referred to as a "specialty" rotor, has been introduced for use in the aforementioned Case International Serial 1600 Axial-Flow Combine. Apparently, the goal of the specialty rotor is to provide a single basic rotor designed to handle a variety of different crops. The rotor has a forward threshing area and a rearward separating area which together support a checkerboard pattern of multiple spaced-apart threshing and separating elements disposed in helical rows. The elements are individually mounted to the exterior of the rotor at respective spaced-apart single attachment sites. This prior art checkerboard pattern defines continuous helical criss-crossing paths extending from the entry end to the discharge end of the specialty rotor.

The specialty rotor appears to be a step in the right direction toward the goal of being able to provide a basic rotor designed to accommodate various crops and crop conditions. However, even this specialty rotor still falls short of reaching this goal. Under certain tough crop conditions, the checkboard pattern of single site threshing elements covering the forward threshing area of the specialty rotor promotes an augering-type flow of minimially-threshed crop material along the continuous helical paths which increases the amount of unthreshed grain conveyed through the tailings elevator of the combine and increases the horsepower and thereby the fuel required to operate the combine.

Consequently, a need exists for improvement of the adaptability of the threshing action of the axial flow specialty rotor to handle various crop and crop conditions.

SUMMARY OF THE INVENTION

The present invention provides an axial flow rotor with helical threshing extension members designed to satisfy the aforementioned need. The helical threshing extension members are employed at least in pairs by the axial flow crop threshing and separating rotor. The rotor includes an exterior surface having a forward threshing area and rearward separating area, a checkerboard pattern of multiple spaced-apart attachment sites in criss-crossing helical rows, and a checkerboard pattern of multiple spaced-apart threshing elements in criss-crossing helical rows defining continuous helical criss-crossing paths extending from an entry end to a discharge end of the rotor.

In accordance with the present invention, the axial flow rotor additionally incorporates helical threshing extension members in its forward threshing area which are substituted for, and occupy the locations of, at least pairs of single-sited threshing elements on the rotor. The extension members are installed in pairs in order to maintain rotor balance, each extension member replacing at least two of the original single-site threshing elements of the checkboard pattern. Thus, each of the helical threshing extension members is installed in one of the helical rows in the forward threshing area of the rotor, connecting to and spanning between at least a pair of the multiple spaced attachment sites provided in the prior art checkerboard pattern.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In General

Figure 1:
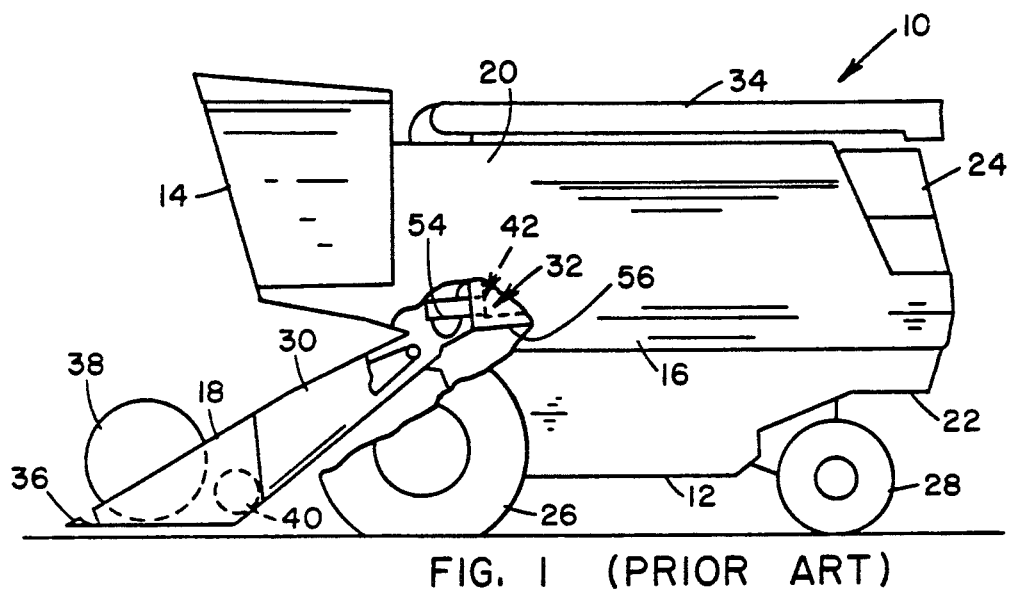
FIG. 1 is a schematic side elevational view of a prior art axial flow combine having a longitudinal threshing and separating rotor to which the helical threshing extension members can be applied in accordance with the principles of the present invention.

Referring to the drawings, and particularly to FIG. 1, there is illustrated a crop harvesting machine, generally designated 10, which is a conventionally wellknown axial flow combine. The combine 10 includes a mobile chassis 12 and has an operator's cab 14, a main housing 16, a crop cutting and gathering header 18, a grain storage bin 20, a rear discharge compartment 22, and an engine compartment 24, all supported by the chassis 12.

All of the moving elements of the combine 10 are driven by an internal combustion engine located within the engine compartment 24. The engine being of substantial horsepower, is adapted not only to drive all of the moving components of the combine 10 but also is capable of operating the drive wheels 26 of the combine which, together with the rear wheels 28, render the combine self-propelled.

The combine 10 harvests grain from standing crop stalks by first severing the stalks from the field and then gathering and feeding the grain-bearing severed stalks from the header 18 through a crop elevator 30 to a crop threshing and separating mechanism 32 operatively mounted in the main housing 16. The mechanism 32 harvests the grain from the severed stalks by first threshing the stalks and finally separating the grain from the threshed stalks before discharge of the stalks and other waste material through the rear discharge compartment 22. The separated grain, in turn, is conveyed within the machine to the grain storage bin 20 for later transfer from the combine 12 by an unloading auger 34 connected to the storage bin 20.

The header 18 is mounted transversely across the forward end of the crop elevator 30 and is operable to cut and gather the crop as the combine 10 is driven across the field. The crop header 18 typically employs a cutterbar 36, a rotatable reel 38, and a converging auger 40. All of these components extend transversely to the path of movement of the combine 10 through the field and are operable for severing the crop stalks relatively close to the ground and gathering and consolidating the severed crop stalks for discharge rearwardly to the crop elevator 30.

Prior Art Axial Flow Threshing and Separating Rotor

Figures 2, 4:
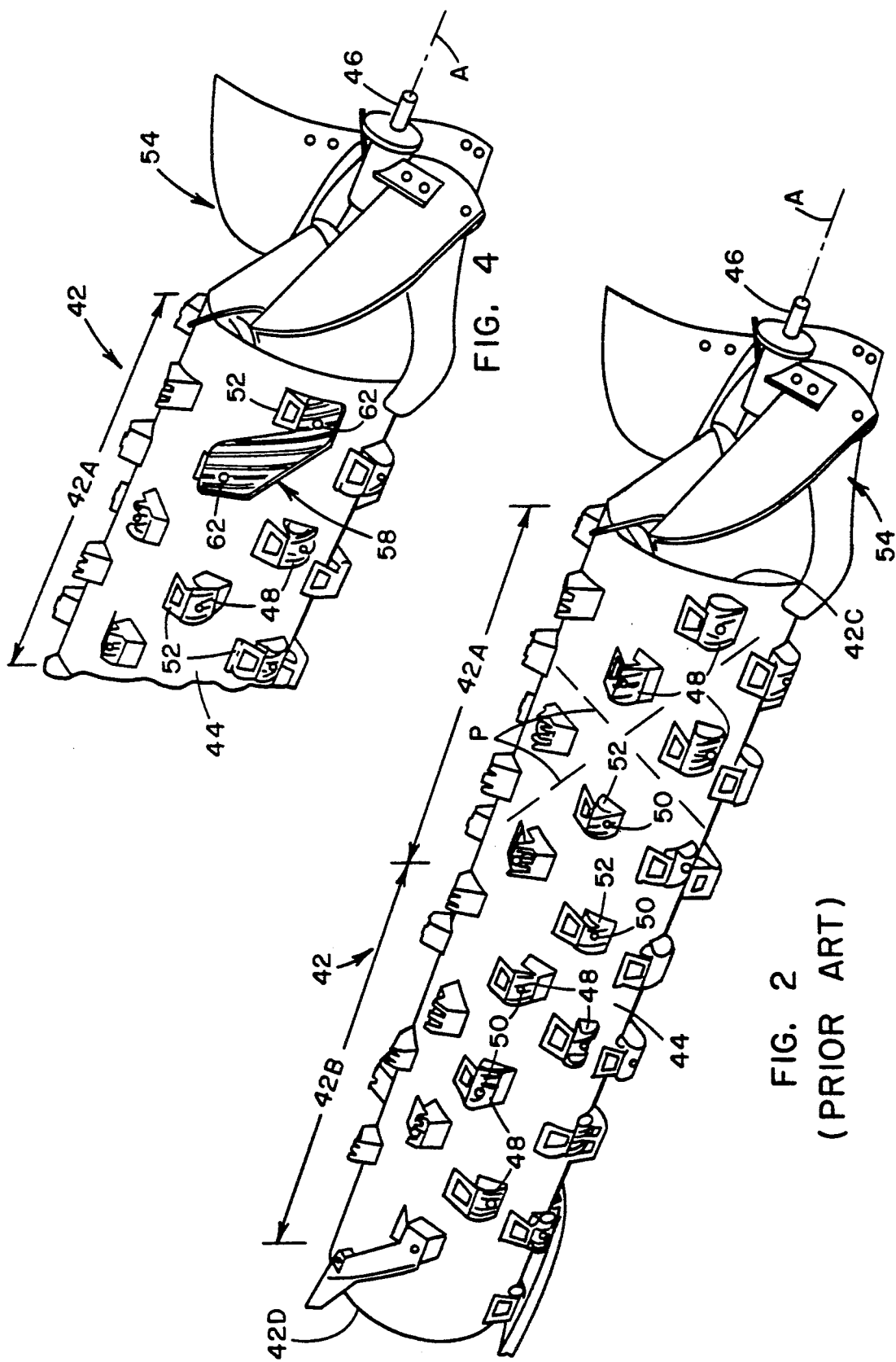
FIG. 2 is an enlarged perspective view of a prior art crop material threshing and separating specialty rotor of the axial flow combine of FIG. 1.
FIG. 4 is a fragmentary perspective view of the threshing and separating specialty rotor similar to that of FIG. 2, except illustrating one of the helical threshing extension members applied thereto in accordance with the principles of the present invention.
Figure 3:
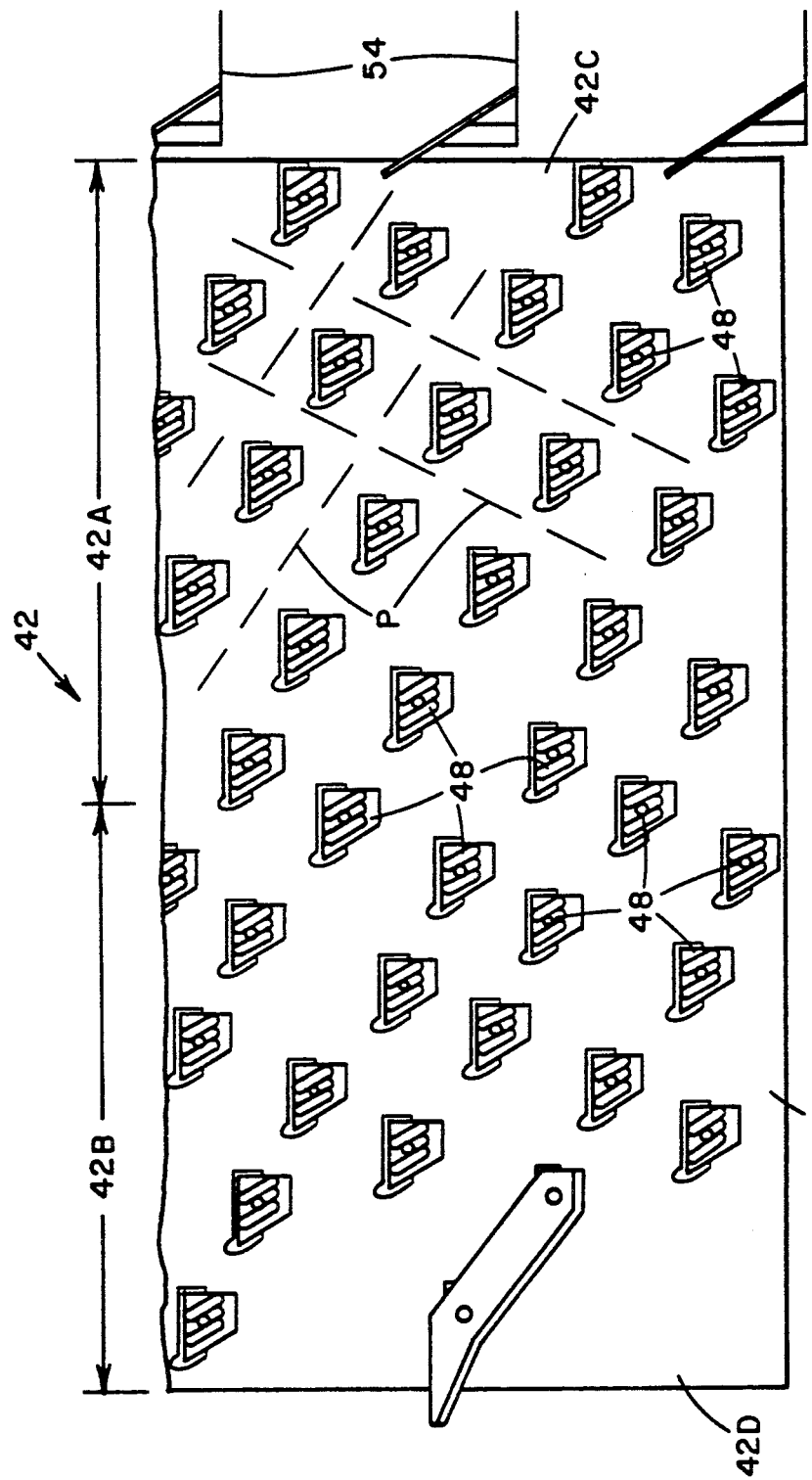
FIG. 3 is a fragmentary plan view of the exterior cylindrical surface of the threshing and separating specialty rotor of FIG. 2 illustrating the prior art checkerboard pattern of threshing and separating elements.

Referring to FIGS. 2 and 3, there is illustrated a prior art axial flow rotor 42 of the crop threshing and separating mechanism 32 in the combine 10. The axial flow rotor 42 being depicted is the one referred to above as the "specialty" rotor, which is used in the aforementioned Case International Serial 1600 Axial-Flow Combine.

The axial flow specialty rotor 42 includes an elongated cylindrical drum or body 44 rotatable about a central shaft 46 adapted to be mounted at its forward and aft ends to the frame of the combine 10. The rotor has a forward threshing area 42A and a rearward separating area 42B. A checkerboard pattern of multiple spaced-apart threshing and separating elements 48 are disposed in helical rows about the exterior surface of the rotor body 44. The elements 48 are individually mounted by fasteners 50, such as bolts, to the respective spaced-apart single attachment sites defined by U-shaped flanges 52 attached to the exterior of the rotor body 44. The checkerboard pattern of attachment flanges 52 and threshing and separating elements 48 define continuous helical criss-crossing paths P extending from an entry end 42C to a discharge end 42D of the specialty rotor 42.

The rotor 42 also includes an impeller 54 on its forward end. The impeller 54 draws the crop material from the feeder and starts its spiralling along the paths P around the exterior of the rotor 42 as the crop material passes through a cylindrical cage 56 (FIG. 1). The impeller 54 also draws a flow of air in through the front of the cage 56 which assists in moving the crop material through the cage.

Under certain tough crop conditions, the checkboard pattern of single site threshing elements 48 covering the forward threshing area 42A of the specialty rotor 42 promotes an augering-type flow of minimially-threshed crop material along the continuous helical paths which increases the amount of unthreshed grain conveyed through the combine 10 and increases the horsepower and thereby the fuel required to operate the combine 10.

Axial Flow Rotor Having Helical Extension Members

Figure 5:
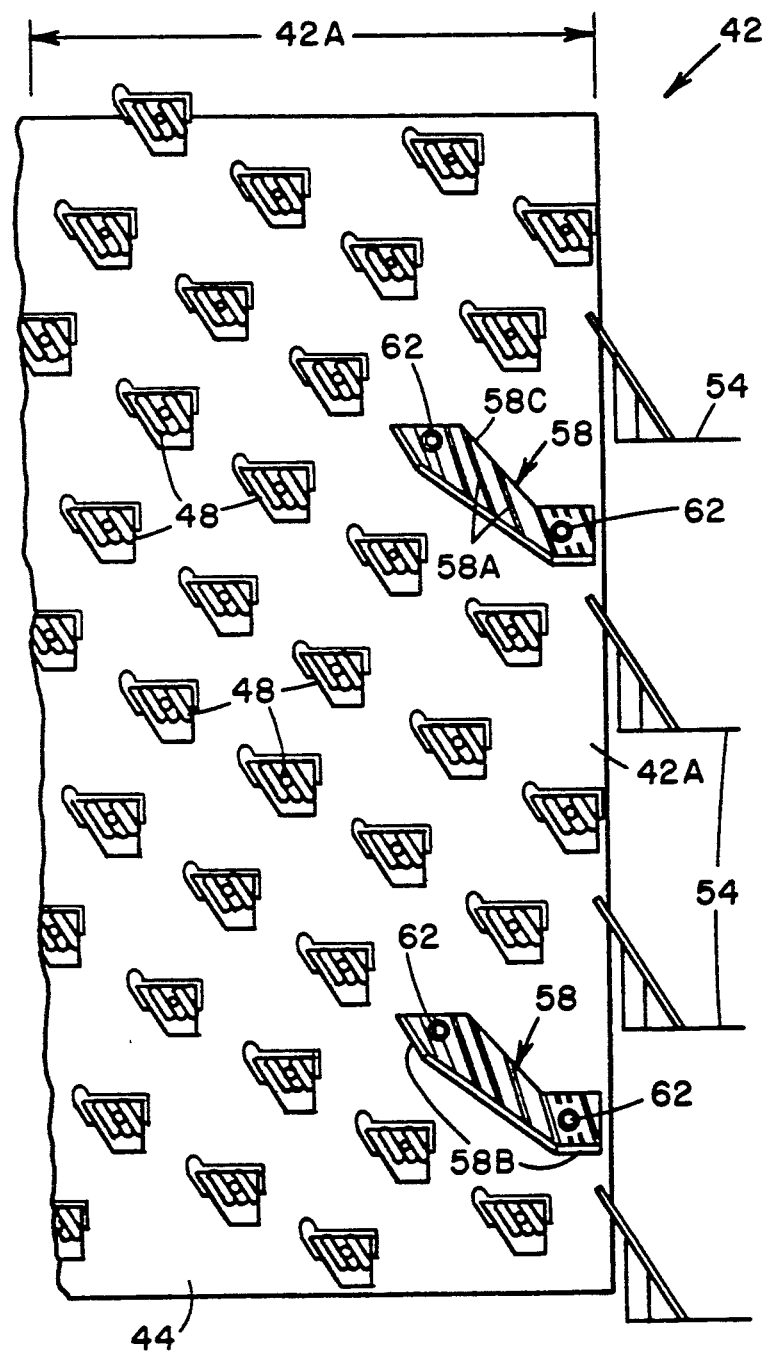
FIG. 5 is a fragmentary plan view of the exterior cylindrical surface of the threshing and separating specialty rotor of FIG. 4 illustrating the modified pattern of threshing elements incorporating a pair of the helical threshing extension members in accordance with the principle of the present invention.

Referring to FIGS. 4–7, there is illustrated the axial flow specialty rotor 42 after modification to incorporate a pair of helical threshing extension members 58 in accordance with the principles of the present invention. The helical threshing extension members 58 are employed at least in pairs by the axial flow rotor 42, as seen in FIG. 5, in symmetrical relation to one another with respect to a longitudinal central axis A of the rotor body 44 defined by its central shaft 46 in order to maintain the balance of the rotor 42 as it undergoes rotation about the longitudinal axis A. The helical threshing extension members 58 are incorporated in the forward threshing area 42A of the rotor 42. Each helical extension member 58 is substituted for, and occupies the locations of and the space between, at least a pair of the single-sited threshing elements 48 on the rotor 42.

Thus, each of the helical threshing extension members 58 is installed in one of the helical rows in the forward threshing area 42A of the rotor 42, connecting to and spanning between the pair of the multiple spaced attachment flanges 52 provided in the checkerboard pattern. Each helical extension member 58 is located to disrupt the continuous flow path of the crop material and cause wedging of the crop material between the extension member and a concave of the cage 56, thereby increasing the amount of threshing of the crop material in the forward threshing area and enabling the modified specialty rotor 10 to thresh even the toughest crops using less horsepower than previously. Capacity of throughput is increased while using less fuel. Also the separated grain is cleaner because of the increased threshing. Since the threshing action increases as more extension members 58 are substituted on the rotor 10, the rotor 10 can be tailored to met the particular crop conditions being encountered.

Figure 6:
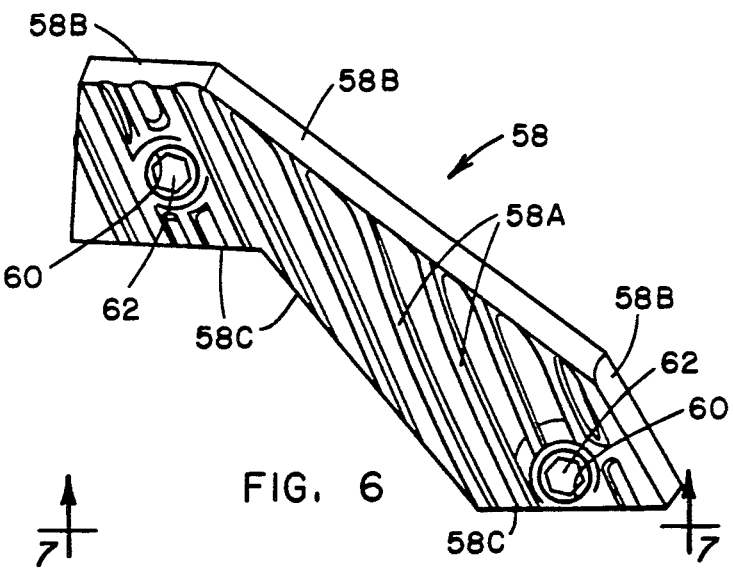
FIG. 6 is an enlarged top plan view of one helical threshing extension member.
Figure 7:
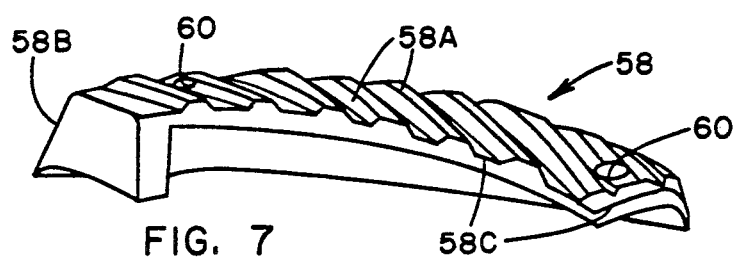
FIG. 7 is a trailing side elevational view of the helical threshing extension member as seen along line 7—7 of FIG. 6.

Referring to FIGS. 6 and 7, there is shown an example of the configuration that the helical extension member 58 can take. The member 58 has a ribbed outer surface 58A generally similar to that of the prior art threshing elements 48. Holes 60 are provided at the opposite end portions of the member 58 for receiving bolts 62 to releasably fasten the member 58 to the flanges 52. When use of the members 58 is not desired, they can be easily removed from the rotor 10 and the single threshing elements 48 re-installed on the rotor. The leading edge 58B of the member 58 has an inclined surface for assisting in the advancement of the crop material into the wedgeshaped space between the member 58 and the concave. The trailing edge 58C of the member 58 overlies the flanges 52 on the rotor body 44. The extension member 58 has a helical, arcuate longitudinal shape which matches the curvature of the exterior surface of the rotor body 44 along the helical row.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An axial flow combine rotor, comprising:
   (a) an elongated cylindrical body having an exterior surface with a forward threshing area and rearward separating area;
   (b) a checkerboard pattern of multiple spaced-apart attachment sites in criss-crossing helical rows;
   (c) a checkerboard pattern of multiple spaced-apart threshing elements in said forward threshing area in criss-crossing helical rows defining continuous helical criss-crossing paths extending from an entry end to a discharge end of said body; and
   (d) multiple helical threshing extension members disposed in said forward threshing area of said rotor body, each of said extension members occupying and spanning between the locations normally occupied by at least two of said single-sited threshing elements.

2. The rotor of claim 1 wherein said helical threshing extension members are installed in pairs on said rotors in symmetrical relation to one another with respect to a central axis of said rotor body in order to maintain the balance of said rotor as it undergoes rotation.

3. The rotor of claim 1 wherein each of said extension members which replaces at least two of said single-sited threshing elements of said checkboard pattern thereof are installed in one of said helical rows in said forward threshing area of said rotor.

4. The rotor of claim 1 wherein each of said extension members is connected to and spans between at least a pair of the multiple spaced attachment sites.

5. The rotor of claim 1 wherein each said extension members has an arcuate longitudinal shape matching the curvature of said exterior surface of said cylindrical body.

6. The rotor of claim 1 wherein each of said extension members has a ribbed outer surface.

7. An axial flow combine rotor, comprising:
   (a) an elongated cylindrical body having an exterior surface with a forward threshing area and rearward separating area;
   (b) a checkerboard pattern of multiple spaced-apart attachment sites in criss-crossing helical rows;
   (c) a checkerboard pattern of multiple spaced-apart threshing elements in said forward threshing area in 0 criss-crossing helical rows defining continuous helical criss-crossing paths extending from an entry end to a discharge end of said body; and
   (d) multiple helical threshing extension members disposed in said forward threshing area of said rotor body, each of said extension members occupying and spanning between the locations normally occupied by at least two of said single-sited threshing elements;
   (e) said helical threshing extension members being installed in pairs on said rotors in symmetrical. relation to one another with respect to a central axis of said rotor body in order to maintain the balance of said rotor as it undergoes rotation;
   (f) each of said extension members which replaces at least two of said single-sited threshing elements of said checkboard pattern thereof being installed in one of said helical rows in said forward threshing area of said rotor.

8. The rotor of claim 7 wherein each said extension members is connected to and spans between at least a pair of the multiple spaced attachment sites.

9. The rotor of claim 7 wherein each of said extension members has an arcuate longitudinal shape matching the curvature of said exterior surface of said cylindrical body.

10. The rotor of claim 1 wherein each of said extension members has a ribbed outer surface.

* * * * *